United States Patent [19]

Chevereau et al.

[11] Patent Number: 5,093,075
[45] Date of Patent: Mar. 3, 1992

[54] UPPER INTERNAL NUCLEAR REACTOR EQUIPMENTS INCLUDING A FLOW SEPARATION DEVICE

[75] Inventors: Gérard Chevereau, Le Raincy; Alain Hevzë, Paris, both of France

[73] Assignee: Framatome, Courbevoie, France

[21] Appl. No.: 584,442

[22] Filed: Sep. 17, 1990

Related U.S. Application Data

[63] Continuation of Ser. No. 308,501, Feb. 10, 1989, abandoned.

[30] Foreign Application Priority Data

Feb. 11, 1988 [FR] France ............... 88 01647

[51] Int. Cl.[5] .................................. G21C 15/00
[52] U.S. Cl. ............................ 375/353; 376/399; 376/400
[58] Field of Search ............... 376/353, 399, 307, 400

[56] References Cited

U.S. PATENT DOCUMENTS

| | | | |
|---|---|---|---|
| 3,849,257 | 1/1974 | Bevilacqua | 376/353 |
| 3,861,999 | 1/1975 | Zmola et al. | 376/353 |
| 4,092,216 | 5/1978 | Aubert | 376/353 |
| 4,557,891 | 12/1985 | Gibbons | 376/353 |
| 4,666,653 | 5/1987 | Millot et al. | 376/353 |
| 4,681,728 | 7/1987 | Veronesi et al. | 376/353 |
| 4,716,013 | 12/1987 | Veronesi et al. | |
| 4,752,438 | 6/1988 | Desfontaines et al. | 376/353 |
| 4,770,840 | 9/1988 | Leroy et al. | 376/399 |
| 4,788,032 | 11/1988 | Baujat et al. | 376/399 |
| 4,842,813 | 6/1989 | Desfontaines et al. | 376/353 |

FOREIGN PATENT DOCUMENTS 0222373  5/1987  European Pat. Off. .

Primary Examiner—Harvey E. Behrend
Attorney, Agent, or Firm—Pollock, Vande Sande & Priddy

[57] ABSTRACT

Upper internals for a pressurized nuclear reactor include an assembly for collecting the coolant leaving the core and a separating device. The device has guides for the control clusters and their drive shafts, a lower plate formed with passages for the coolant leaving the core and an upper plate formed with holes for passage of the same coolant into the collection assembly or plenum. A peripheral shroud may connect the plates together. Each cluster guide of the flow separation device has an internal casing devoid of openings, having a practically coolant-tight connection with the plates, whereby the control clusters and their drive shafts are protected against the high speed coolant flow from the core to the outlet nozzle.

3 Claims, 4 Drawing Sheets

UPPER INTERNAL NUCLEAR REACTOR EQUIPMENTS INCLUDING A FLOW SEPARATION DEVICE

This application is a continuation of application Ser. No. 07/308,501, filed Feb. 10, 1989 now abandoned.

BACKGROUND OF THE INVENTION

1. Technical Field

The invention relates to upper internal nuclear reactor equipment for a reactor of the type comprising a pressure vessel closed by a removable cover and including at least one coolant input nozzle and at least one coolant output nozzle for the coolant situated in the vicinity of the cover, a core formed of fuel assemblies and in which the coolant flows upwardly, a plurality of control clusters actuated by drive shafts projecting through the cover of the reactor, said upper internal equipment including an assembly for collecting the coolant leaving the core toward the output nozzle, and a device for fractionating the coolant flow, including guides for the control clusters and drive shafts, inserted between the collection assembly or plenum and the core and including a lower plate formed with passages for the coolant leaving the core, an upper plate formed with passages for the coolant towards the collection assembly and a peripheral shroud connecting the plates together.

It is particularly, although not exclusively, suitable for use in pressurized water nuclear reactors, called PWRs. And it is of particular advantage in spectral shift reactors. In such reactors, the control clusters include clusters having rods which contain matter which exhibits parasitic neutron absorption, for adjusting the power of the reactor, and water displacement rods, preferably containing fertile material.

2. Prior Art

In the equipment of the above-defined type described in French No. 2,595,501, the flow separation or fractionating device includes spaced tubes connecting together the coolant passages in the upper and lower plates of the device and placed between the cluster guides.

That construction solves numerous problems. On the other hand, it is difficult to accommodate the mutual variations between the numerous spacer tubes. In the spectral shift reactors, where there is a large number of clusters, and consequently of cluster guides, the guiding structure above the core of the reactor is complex and construction is difficult.

In another prior art arrangement (European No. 0,222,373), the coolant flows axially within cluster guide shrouds. The high speed coolant sweeping the rods of each cluster, may vibrate the rods. The core upper plate must be quite thick to compensate for the lack of spacers.

SUMMARY OF THE INVENTION

It is an object of the invention to provide improved upper internal nuclear reactor equipment. It is a more specific object to provide upper internals wherein it is easier to locate the cluster guides inside the coolant flow separation device.

For that purpose, upper internals of the above-defined type have cluster guides which include an external casing devoid of openings for upward flow of the coolant, each external casing having a substantially coolant-tight connection with the upper and lower plates.

In a typical embodiment, at least some of the casings are fixed to one of the plates and are slidably received in the other plate, so as to allow free axial expansion of said casings.

BRIEF DESCRIPTION OF THE DRAWINGS

The invention will be better understood from the following description of a particular embodiment, given by way of example only. The description refers to the accompanying drawings.

DETAILED DESCRIPTION OF A PREFERRED EMBODIMENT

Figure 1:
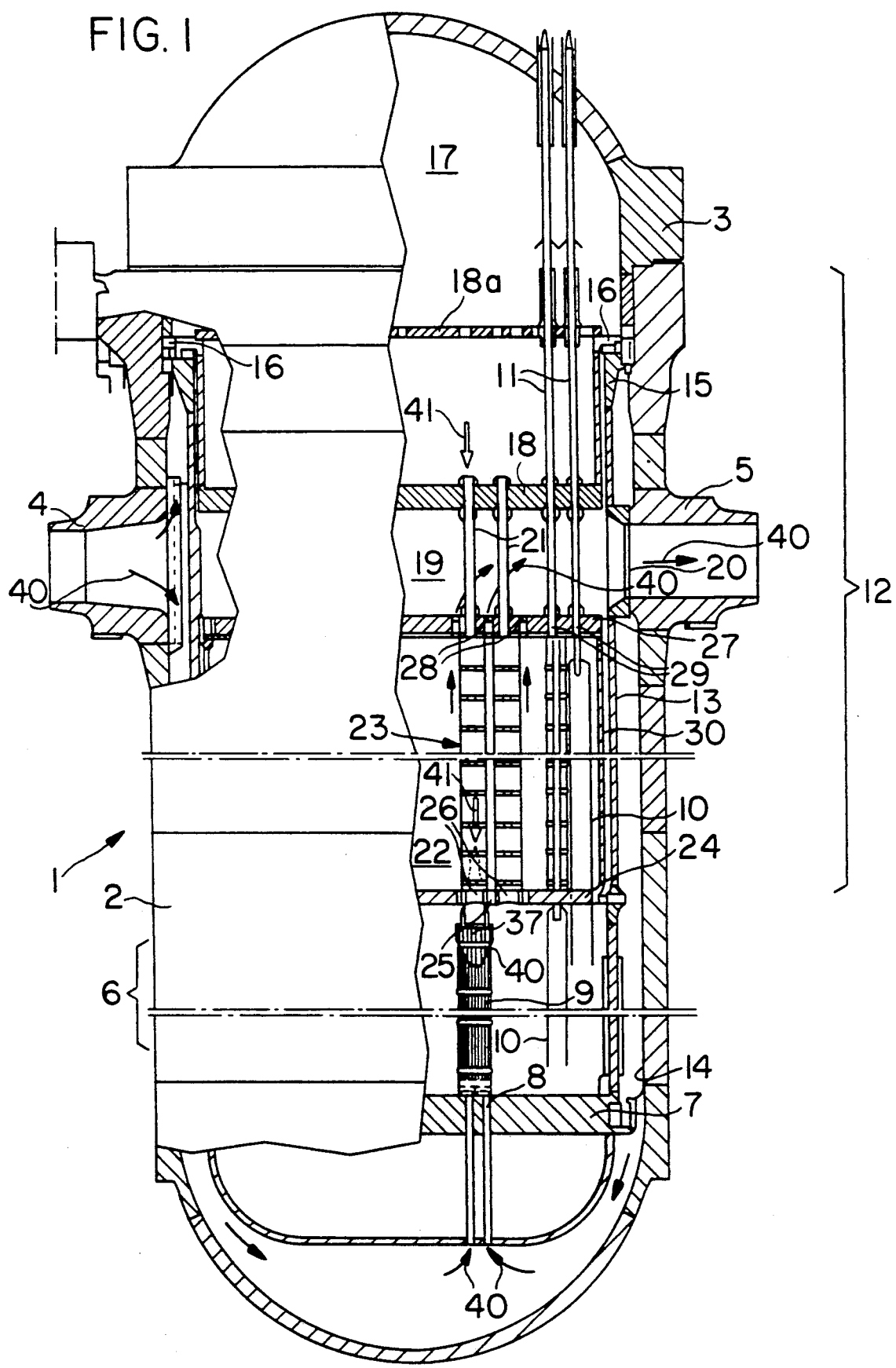
FIG. 1 is a simplified view of a reactor with upper internal nuclear reactor equipment in accordance with the invention, in partial cross-section through a vertical plane.

Referring to FIG. 1, a pressurized water reactor 1 has a general construction similar to that described in European No. 0,238,390, to which reference may be made. The reactor comprises a pressure vessel 2 for resisting the pressure of the cooling water. The vessel is closed by a removable cover 3 and has inlet nozzles 4 and outlet nozzles 5 for the coolant. It contains a core 6 carried by a lower support plate 7 formed with holes 8 for upward passage of the coolant to the fuel assemblies, such as assembly 9. Control clusters 10 are movable vertically by drive shafts 11 projecting above the cover 3.

In a spectral shift reactor, there are two types of control clusters. The clusters of the first type have rods which contain neutron absorbing matter, and they are used for controlling the power. The clusters of the second type for displacing water from the core when they are inserted into the core. Such rods are neutron transparent or "grey" in earlier solutions. They preferably contain fertile material such as natural (or depleted) uranium and/or thorium in oxide form. When spectrum variation clusters containing fertile material are removed from the core after they have been irradiated, they deliver heat which has to be evacuated. As will be shown later, cooling is achieved by a slow downward flow of coolant in upper internals according to the invention. Only two clusters and their drive shafts 11 are illustrated in FIG. 1.

The reactor further includes upper internals 12 between core 6 and cover 3. An external cylindrical barrel 13, spaced apart from the inner surface 14 of vessel 2 and comprising an upper flange 15 clamped between cover 3 and vessel 2, channels the flow of coolant entering through nozzles 4 and directs it downwardly along the inner surface 14 of vessel 2. Then the coolant enters core 6 through the lower part of the fuel assemblies 9.

Passage means 16 are formed across flange 15 for deriving a small flow of the coolant from inlet nozzle 4 to the volume 17 defined by the cover 3 of the reactor 1 and the upper internals 12 of the reactor.

An upper part of the upper internals consists of a cluster guide support 18 having the shape of an inverted hat and an upper spacer 18a for guiding the drive shafts 11 or thimbles slidably receiving them.

In an assembly 19 for collecting the coolant leaving the reactor, the coolant is deflected transversely toward the outlet nozzles 5 connected to heat exchange circuits external to the reactor (not shown) through openings 20 formed in the cylindrical barrel 13 and aligned with the outlet nozzles 5. Assembly 19 includes guide tubes 21 for the drive shafts 11 and protects the shafts against the turbulences of the coolant which flows toward nozzles 5.

The upper internals 12 further include a cluster guide and flow separation device 22 (FIG. 2) disposed between core 6 and the collection assembly or "plenum" 19.

Device 22 includes a lower plate 24 formed with holes 25 for entrance of the coolant leaving core 6 and with holes 26 for the control clusters 10. It further includes an upper plate 27 formed with holes 28 enabling the coolant to flow into the collection assembly 19 and with holes 29 for the drive shafts 11, aligned vertically with the guide tubes 21 and the holes 26. Cluster guides 23 communicate the coolant flow holes 26 and 29.

The two plates 24 and 27 of the device are connected together at its periphery by a shroud 30 so that the whole of the device 22 forms a caisson. The shroud is preferably unperforated, except possibly as regards inspection holes. Rigidity of the caisson is increased by mechanical elements which connect the two plates. Such elements may include spacers fixed rigidly to plates 24 and 27 and connecting the plates to each other. One such spacer 31 is illustrated on FIG. 2. It is also possible to use some (or all) of the cluster guides 23 as spacers, by fixing them rigidly to the plates 24 and, 27.

Cluster guides 23 have the further function of protecting clusters 10 and drive shafts 11 against the upward coolant flow across device 22 towards collection assembly 19.

Figure 5:
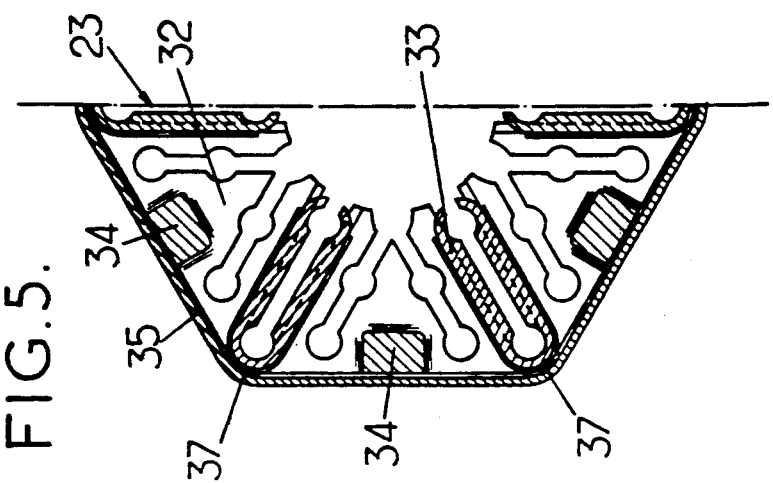
FIG. 5 is a half cross-section of a cluster guide through line V—V of FIG. 2.

The cluster guides 23 may be welded assemblies (FIG. 5) having horizontal cut-out plates 32 or "cards" vertically distributed along continuous guide sleeves 33 and along square-shaped sections 34 extending over the entire height of the cluster guide. In accordance with the invention, each cluster guide includes an external casing 35 whose wall is devoid of coolant passage openings, having a substantially water tight connection with the upper and lower plates 27, 24.

The channel defined by casing 35 opens upwardly into a channel defined by a respective guide tube 21 which projects upwardly beyond support 18 and communicates with volume 17 directly or through calibrated openings, as will be seen later. Casing 35 may, for example, have a substantially hexagonal cross-section.

The square-shaped sections 34 and/or the guide sleeves 33 may be fixed to the external casing 35 in any conventional manner, for example by welding beads 37. The plates 32 may be held in position in radial abutment against the casing during mounting, for example by means of additional welded lugs.

Continuous guiding of the clusters is not always required. In certain cases, it is sufficient to provide slotted tubes extending over the entire height of the cluster guides 23, which makes it possible to guide part of the cluster rods. The cards 32 may be fixed, for example by means of pins, directly to the external casing 35 rather than on square-shaped sections 34.

Figure 3:
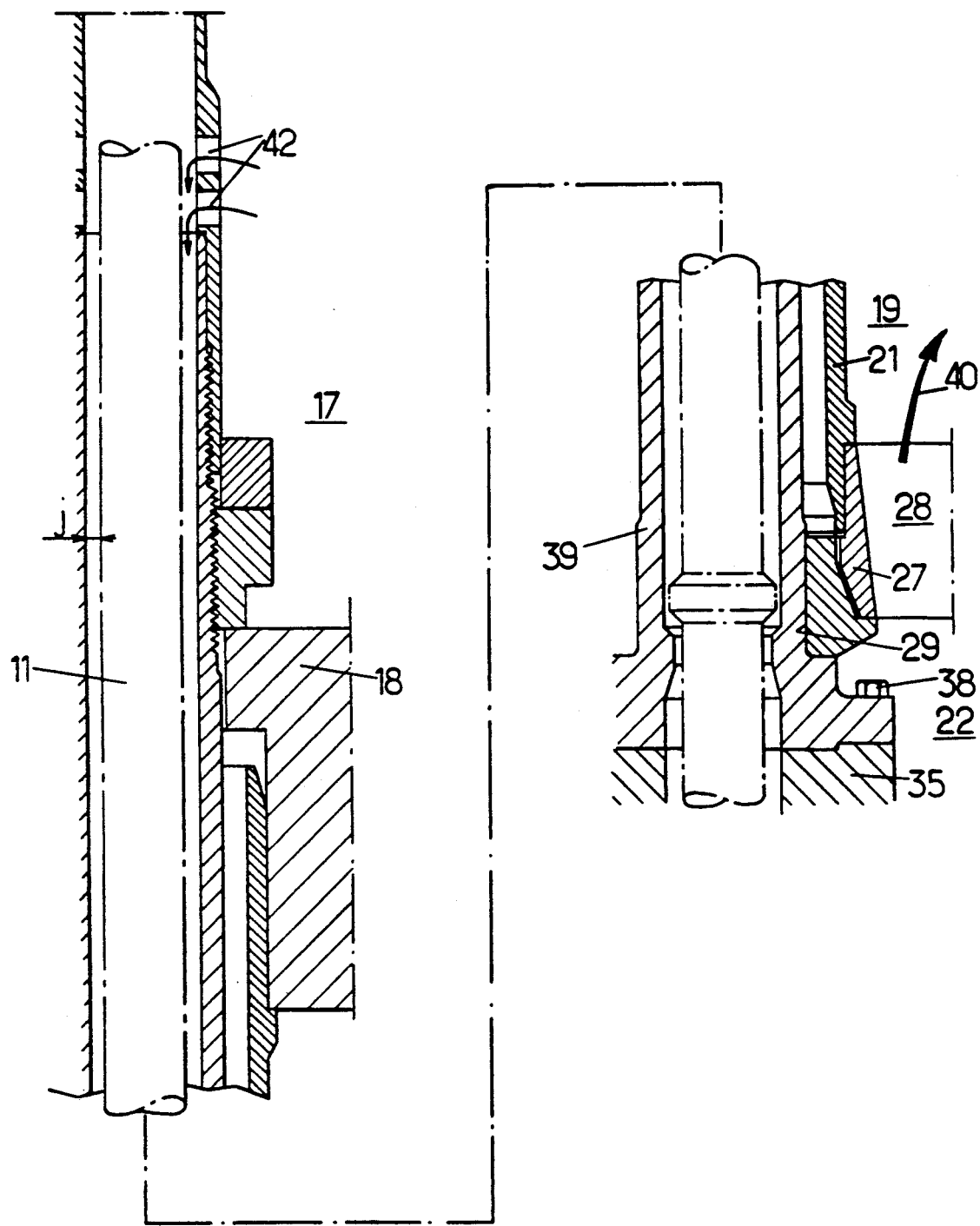
FIG. 3 is a vertical cross-section of a possible embodiment of the outlet zone of the coolant leaving the flow separation device, implementing the construction shown schematically in FIG. 2.

FIG. 3 illustrates a possible construction of the junction between a guide tube 21 and the upper plate 27. In the illustrated embodiment, tube 21 is composite. It comprises an outer tube 21 which constitutes the guide tube properly speaking, whose length is approximately equal to the distance between plates 18 and 27, and an internal sleeve 39 which projects downwardly beyond the upper plate 7 and upwardly beyond spacer 18a. A plurality of holes 28 for the coolant, e.g., four or six, are distributed around each guide tube 21.

An upper flange of the casing 35 of each cluster guide is rigidly fixed, for example by bolts and nuts 38, to the lower part of the internal sleeve 39 of the respective guide tube 21.

As indicated above, the cluster guides 23 may constitute spacers which connect plates 24 and 27. Their end portions are then secured to the plates. However, particularly in a spectral shift reactor, there are numerous guides and some degree of redundancy. It may then be preferable to secure some of the guides 23 to only one of the plates, for example by welding, while their other ends are slidably received in the other plate so as to allow free differential expansion of the cluster guides in the separation device 22. Furthermore, this arrangement facilitates assembly which may otherwise be difficult due to manufacturing variations in the length of the tubes to be assembled.

Figure 4:
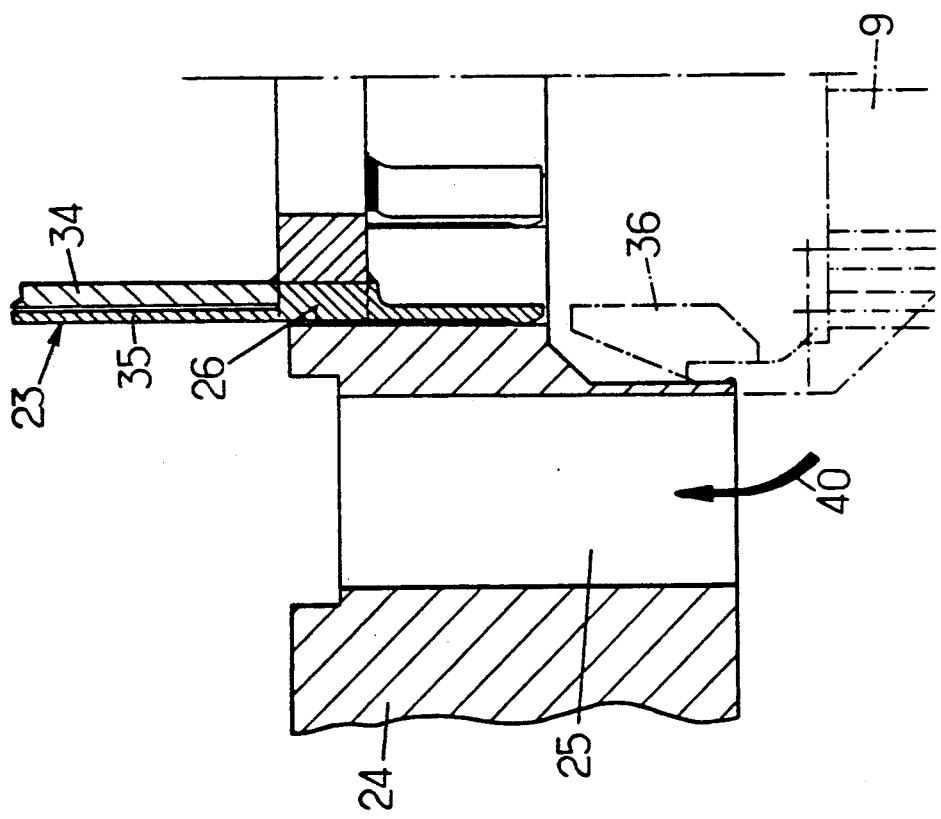
FIG. 4 is a vertical sectional view of a part of the lower flow separation plate at the level of the sliding junction with a cluster guide in an advantageous arrangement of the invention.

FIG. 4 shows a construction of the slidable connection by way of example, which is in no way limitative. A lower end portion of casing 35 has a sliding fit in the respective hole 26. The casing may consequently expand and retract by sliding within the lower plate 24. The lower portion of the hole 26 slidably receives a respective upper nozzle 36 of a corresponding fuel element assembly 9. The nozzle is formed with an opening having a shape corresponding to that of the cluster of elongated elements. Consequently, the upward flow of coolant is deflected laterally, as indicated by arrow 40, at least when the rods of the cluster are engaged into the upper nozzle.

Referring to FIG. 3, the diameters of shaft 11 and of sleeve 39 are proportioned to provide a radial clearance j, generally of several millimeters (typically about 12 mm for a fertile cluster and about 10 mm for a neutron absorbing cluster), for providing a communication between volume 17 and each cluster guide 23. A local restriction of the sleeve may be provided for receiving a bulge of the shaft when the latter has moved to the lowermost position illustrated in FIG. 3. The clearance will generally be greater for the shafts of the fertile spectrum variation clusters than for the absorbing clusters, since more cooling is necessary.

Figure 2:
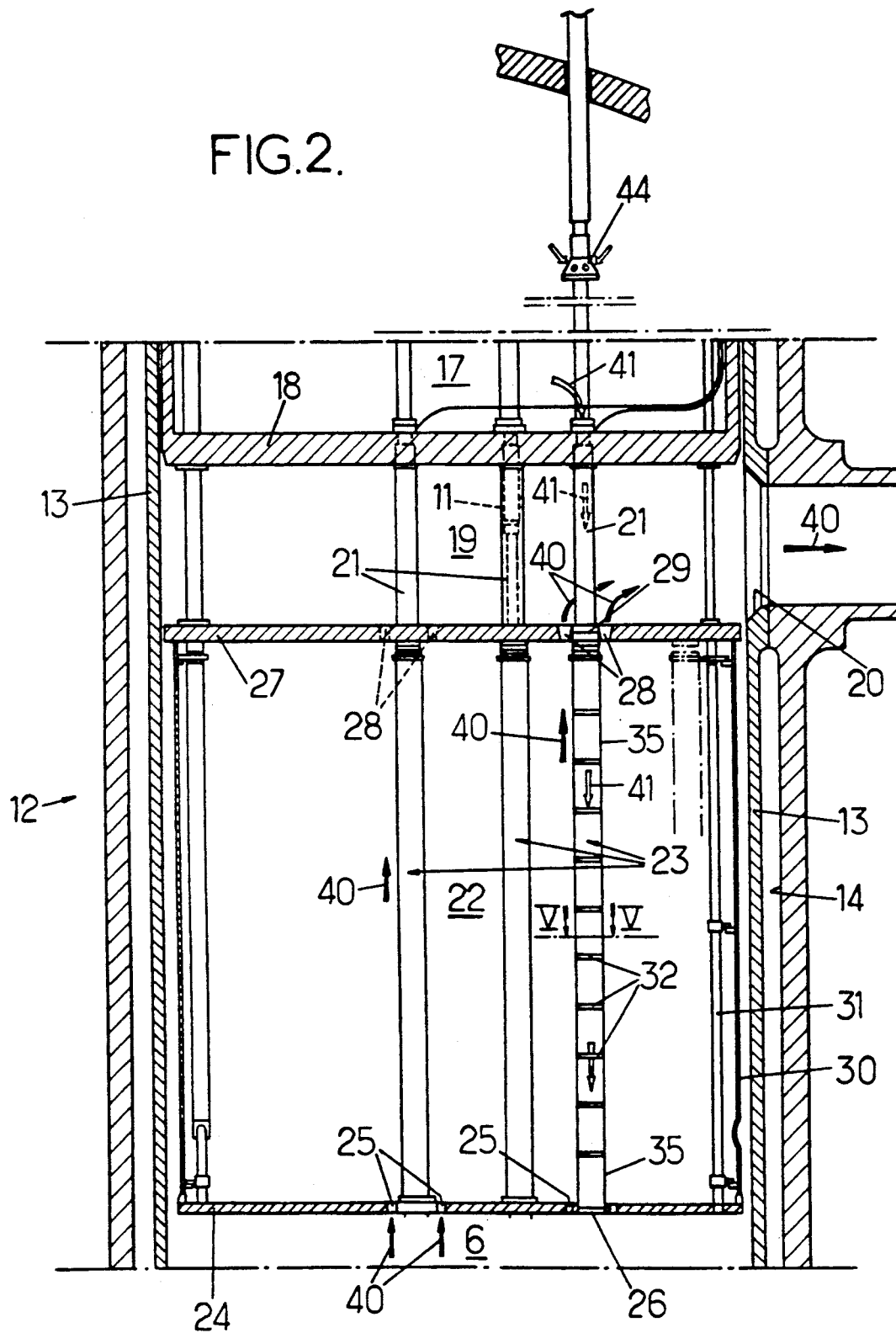
FIG. 2 is a schematic enlarged view, in cross-section through a vertical plane, of nuclear reactor upper internals according to the invention.

As illustrated in FIG. 3, the clearance receives coolant through openings 42 formed in the upper portion of the sleeve 39, consisting of a plurality of parts which are connected by a threaded connection. As illustrated in FIG. 2, the clearance receives coolant through holes formed in a thermal protection tulip 44, which may be of known construction, in addition to or in substitution for coolant received through openings 42.

Operation of a nuclear reactor comprising internals as described above is as follows under normal conditions. The main coolant flow follows the path indicated by full line arrows 40 in FIGS. 1 to 4. Low temperature coolant enters reactor 1 through the inlet nozzles 4. The greater part of the coolant is deflected downwardly by the external barrel 13 and then flows upwardly through the fuel assemblies 9 of the core 6 of the reactor. Hot coolant flowing out of a fuel assembly 9 is deflected by the upper nozzle 36 toward holes 25 which open into the device 22, between the cluster guides 23. The coolant from the core then passes through the device 22 between the casings 35 of the cluster guides 23 and into the collection assembly 19 through holes 28. The coolant is then deflected between the guide tubes 21 for the drive shafts 11, flows out of the barrel 13 across holes 20 and finally exits through the outlet nozzles 5.

The coolant leaving the assemblies is therefore isolated over its complete path from the coolant volume surrounding the control clusters and their drive shafts contained sealingly in the casings 5 which separate them from the rest of the device 22, and in guide tubes 21 which separate them from the coolant circulating through collection assembly 19.

On the other hand, the channels defined by casings 35 and tubes 21 are directly connected to the volume 17 under the cover of the reactor and which is at a pressure slightly above that of the coolant leaving the fuel assemblies.

An axial downflow (as shown by white arrows 41 in FIGS. 1 and 2) therefore prevails in tubes 21 and casings 35 and provides cooling of the clusters, particularly fertile clusters in a spectral shift reactor. The downward flow additionally assists fall of all clusters when required, which enhances nuclear safety.

The passage means 16 allowing a small flow of cold coolant to feed the dome 17 under the cover of the reactor may be openings formed across flange 15 of the barrel 13.

We claim:

1. In a nuclear reactor comprising a pressure vessel closed by a removable cover and including at least one coolant input nozzle and at least one coolant output nozzle situated in the vicinity of the cover, a core formed of fuel assemblies and in which the coolant flows upwardly and a plurality of vertically movable control clusters actuated by drive shafts projecting through the cover of the reactor, upper internals positioned above said core, said upper internals including:
a collection assembly for collecting the coolant and directing it towards the output nozzle, having a plurality of guide tubes each for receiving one of said drive shafts; and
a device for fractionating the coolant flow, including cluster guides for the control clusters and drive shafts, located between the collection assembly and the core and including a lower plate formed with passages located between said cluster guides, for the coolant leaving the core, an upper plate formed with passages for the coolant from the flow fractionating device towards the collection assembly and a peripheral shroud connecting the plates together,
wherein each of said cluster guides of the flow fractionating device comprises an outer casing devoid of openings, having a substantially coolant-tight connection with said lower plate and upper plate and having a substantially coolant-tight connection with a respective one of said guide tubes, each of said guide tubes having a lateral wall devoid of openings in said collection assembly and opening into a volume formed under said cover;
said upper internals further comprising a cylindrical barrel located within the vessel and cooperating with an inner surface of said vessel for defining a passage for coolant circulation from the input nozzle downwardly to a space from which said coolant flows upwardly into the fuel assemblies, said barrel being connected to the vessel by a flange formed with means for delivery of a controlled flow of cold coolant, at a pressure higher than that of the coolant flowing out of the core, from the input nozzle to said volume under the cover, from the cover to the upper end of each of said guide tubes, and from the lower end of each of said guide tubes to a respective one of said cluster guides.

2. Upper internals according to claim 1, wherein the casings of at least some of the cluster guides are secured to one of the upper and lower plates and are slidably received in the other one of said upper and lower plates for free expansion and retraction therein.

3. Upper internals according to claim 1, wherein each of said cluster guides in the separation device has a plurality of vertically distributed horizontal plates, some at least of the plates being secured to the respective casing.

4. In a nuclear reactor comprising a pressure vessel closed by a removable cover and including at least one coolant input nozzle and at least one coolant output nozzle situated in the vicinity of the cover, a core formed of fuel assemblies and in which the coolant flows upwardly and a plurality of clusters of control rods vertically movable into and out of respective ones of said fuel assemblies by respective drive shafts projecting through the cover of the reactor, upper internals positioned above the core, said upper internals including:
a collection assembly for collecting the coolant and directing it toward the output nozzle, having a plurality of guide tubes, each aligned with a respective one of said fuel assemblies, each for receiving one of said drive shafts, each having a lateral wall devoid of openings and each opening upwardly into a volume formed under said cover and fed with coolant from the input nozzle, a radial clearance being reserved between the drive shaft and the lateral wall for defining a downward coolant flow from said volume; and
a device located between the core and the collection assembly for fractionating the coolant flow exiting from the core, including:
an upper plate formed with first passage means opening into said collection assembly between said guide tubes,
a lower plate located over the core at a level lower than that of said upper plate,
a peripheral shroud connecting said upper plate and lower plate, and
a plurality of cluster guides having a substantially coolant tight connection with said lower plate and said upper plate, each aligned with a respective one of said guide tubes and each providing a coolant communication between a respective one of said guide tubes and an opening formed through said lower plate and receiving an upper nozzle of the fuel assembly aligned therewith, each of said cluster guides having an outer casing devoid of openings, said lower plate being formed with second passage means located between said cluster guides, cooperating with said first passage means for providing a coolant path from said core to said collection assembly around said cluster guides, said upper internals further comprising a cylindrical barrel located within the vessel and cooperating with an inner surface of said vessel for defining a passage for coolant circulation from the input nozzle downwardly to a space from which said coolant flows upwardly into the fuel assemblies, said barrel being connected to the vessel by a flange formed with means for delivery of a controlled flow of cold coolant, at a pressure higher than that of the coolant flowing out of the core, from the input nozzle to said volume under the cover, from the cover to the upper end of each of said guide tubes, and from the lower end of each of said guide tubes to a respective one of said cluster guides.

5. Upper internals according to claim 4, wherein said radial clearance is greater in some of said guide tubes than in the other ones of said guide tubes for causing a greater downward coolant flow to occur from said volume to said core.

* * * * *

UNITED STATES PATENT AND TRADEMARK OFFICE
CERTIFICATE OF CORRECTION

PATENT NO. : 5,093,075
DATED     : March 3, 1992
INVENTOR(S) : Gerard CHEVEREAU, Alain HEUZË

It is certified that error appears in the above-identified patent and that said Letters Patent is hereby corrected as shown below:

On the title page, item [75] Inventors:
    The second inventor's name is misspelled.
The inventor's name should read:
--Alain HEUZË--

Signed and Sealed this

Eleventh Day of January, 1994

Attest:

BRUCE LEHMAN

Attesting Officer    Commissioner of Patents and Trademarks